P. KESTNER.
RECIPROCATING OR ROTARY PUMP.
APPLICATION FILED SEPT. 23, 1914.
1,283,800.
Patented Nov. 5, 1918.
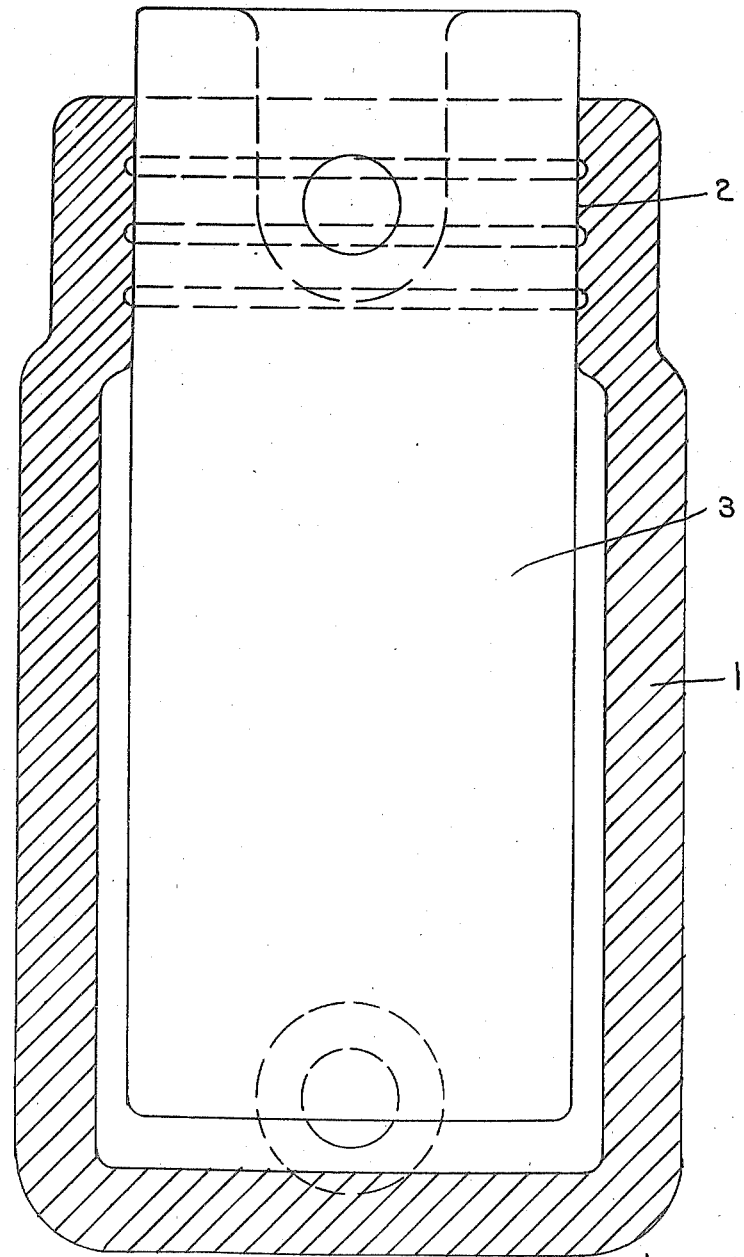
Inventor.
Paul Kestner.
by Heeard Smith & Tennant.
Attys.

UNITED STATES PATENT OFFICE.

PAUL KESTNER, OF PARIS, FRANCE.

RECIPROCATING OR ROTARY PUMP.

1,283,800.

Specification of Letters Patent.

Patented Nov. 5, 1918.

Application filed September 23, 1914. Serial No. 863,223.

*To all whom it may concern:*

Be it known that I, PAUL KESTNER, a citizen of the French Republic, residing at Paris, Republic of France, have invented new and useful Improvements in or Relating to Reciprocating or Rotary Pumps, of which the following is a specification, like characters on the drawing representing like parts.

This invention has reference to improvements in or relating to reciprocating or rotary pumps for pumping liquids and the like and more particularly to the glands, stuffing boxes or bearings thereof.

In many cases great difficulties arise from the employment of stuffing boxes. If the liquid to be pumped acts corrosively upon the packing or contains solid particles of a gritty character the packing very soon wears out and leakage ensues. Many attempts have been made to obviate these difficulties with a variety of packing materials but no success has been obtained on these lines. I was accordingly led to try to dispense altogether with packing and to construct a gland or bearing of metal to metal.

To this end I constructed a plunger passing through a sleeve of metal, the diameters of the parts being such that there was only an exceedingly small clearance between them, in fact just sufficient to permit sliding movement freely. In this way, using for example cast iron or brass, I could obtain a gland or bearing as tight as if it were provided with a stuffing box containing packing material but the durability of such a device is most unsatisfactory. On investigation I found that a gland so constructed may slide freely under the influence of no stresses but that the application of the axial resistance of the fluid to be pumped or the transverse stresses which are incidental to some of these mechanisms causes microscopical enlargements of the plunger in a radial direction in the case of axial stresses and other deformations in the case of transverse stresses sufficient to cause that "seizing" or "galling" which is consequent upon undue friction. Thereafter in a few strokes wear begins and in a short time so much attrition or disturbance of the surfaces has taken place that leakage to an undesirable extent ensues. I obtained these unfavorable results with a variety of metals ordinarily used in engineering practice and in consequence was led to the conclusion that such materials are unsuited for metal-to-metal glands or bearings in cases where the clearance is so minute as practically to abolish leakage.

As a result of these repeated trials and experiments I was led by inference to the conclusion that to construct a gland or bearing of this type free from packing material I must use a material possessed of three qualities. In the first place such metal must resist deformation to a very high degree, in order to avoid the bodily deformations which, as noted above, follow on axial and transverse stresses. In the second place, the surface must be very hard, so as to resist those superficial deformations which constitute "galling" or "seizing". In the third place such metals—even when the liquid to be pumped is water—must possess corrosion-resisting properties so that their surfaces will remain free from rust, oxidation or corrosion as that would soon spoil the close fit between the parts (to be referred to) and cause leakage. Even the small amount of corrosion that may be considered of no great importance in the case of stuffing boxes provided with packing material must be avoided in the case of my metal-to-metal bearings or glands. I found such materials in certain alloys or mixtures of certain elements with iron. These compounds, alloys or mixtures as at present known consist of combinations of iron with certain other elements. Examples of such mixtures or alloys are commercial products known as "tantiron" and "ironac". They are alloys of iron and silicon containing a high percentage of the latter together with small proportions of other elements. In one sample, for instance, I found by analysis 15% of silicon.

Other iron alloys have recently been made possessing similar properties for instance a chromium-silicon-iron alloy. These bodies have as a class corrosion-resisting properties, and they are even proof to certain acids such as sulfuric and nitric acids, though this is not a quality which is uniform for the class. For instance the particular chromium alloy just mentioned which I have tested though far less brittle than tantiron is attacked by some acids, to which the tantiron is resistant. One would be guided in the choice of a particular alloy by the circumstances of the case and the particular liquids to be pumped.

These bodies or alloys are of excessive hardness. They cannot be filed or worked with a steel tool and only yield to grinding operations. They are as a rule very brittle and resist deformation to a very remarkable degree.

My invention consists in constructing bearings or glands for rotary or reciprocating pumps or the like wherein both bearing surfaces are made of such material without the intervention of any packing material and with an exceedingly small clearance.

As an example I have made a 3½" reciprocating pump with a gland and plunger-piston both made of "ironac." The stroke is 6" and speed 50 revolutions per minute when pumping strong sulfuric acid.

The clearance between gland and piston is of the order of .01 millimeter. I have now had this pump in work for a considerable time and in spite of the very small clearance the piston moves quite freely when the pump is working at 100 lbs. pressure per square inch. The leakage is negligible not exceeding one drop in five seconds and neither of the parts shows any appreciable signs of wear. There has been no trace of "galling."

The parts, not being capable of being worked with tools are rough cast, ground with carborundum or similar material and then if necessary polished. The excessive hardness of the surface permits such pumps to deal with gritty fluids with ease, the grit being reduced to impalpable sludge without affecting the alloy, where ordinary metals would score and seize. Such pumps are also peculiarly advantageous for use in pumping strongly acid or corrosive liquids.

I wish it to be understood that though described with reference to these particular materials my invention is not limited thereto but can be carried out with any substance characterized by or possessing the three qualities of very high resistance to deformation, great hardness, and corrosion resisting properties.

I have shown in the drawings a cylinder and plunger made in accordance with my invention. 1 indicates a cylinder in which a plunger 3 operates, said plunger extending through the neck or gland portion 2 of the cylinder. It will be understood that the gland 2 and the plunger 3 possess the three above-described qualities of very high resistance to deformation, great hardness and ability to resist corrosion. The structure shown in the drawing is merely illustrative of one type of pump, but it will be understood that my invention is not limited to any particular form of pump.

What I claim as my invention and desire to secure by Letters Patent is:—

1. In a pump the combination with a cylinder, of a metal plunger therein having corrosion-resisting properties and also having the property of resisting deformation to a high degree, said cylinder having a metal gland or bearing through which the plunger operates with a metal-to-metal contact, which gland or bearing also has corrosion-resisting properties and the property of resisting deformation to a high degree.

2. In a pump the combination with a cylinder having a gland or bearing, of a plunger in said cylinder and operating through said gland or bearing, both said plunger and said gland or bearing being made of an alloy of iron and silicon and constituting metal-to-metal bearing surfaces.

3. In a pump, the combination with a cylinder provided with a gland or bearing having corrosion-resisting properties and also having the property of resisting deformation to a high degree, of a plunger operating in said cylinder and extending through said gland and providing therewith a metal-to-metal contact.

4. The combination with a member having a gland, of a second member subject to stresses extending through and operating in said gland with a metal-to-metal contact, said latter member having corrosion-resisting properties and also having the property of resisting deformation to a high degree.

In testimony whereof I have signed my name to this specification in the presence of two subscribing witnesses.

PAUL KESTNER.

Witnesses:
CHAS. P. PRESSLY,
FELIX LOCDNERCE.